(12) United States Patent
Roscoe

(10) Patent No.: US 8,497,599 B2
(45) Date of Patent: Jul. 30, 2013

(54) ELECTRICAL GENERATOR NETWORK AND A LOCAL ELECTRICAL SYSTEM

(75) Inventor: Andrew J. Roscoe, Glasgow (GB)

(73) Assignee: Rolls-Royce PLC, London (GB)

( * ) Notice: Subject to any disclaimer, the term of this patent is extended or adjusted under 35 U.S.C. 154(b) by 492 days.

(21) Appl. No.: 12/992,725

(22) PCT Filed: May 13, 2009

(86) PCT No.: PCT/GB2009/001204
§ 371 (c)(1),
(2), (4) Date: Nov. 15, 2010

(87) PCT Pub. No.: WO2009/150397
PCT Pub. Date: Dec. 17, 2009

(65) Prior Publication Data
US 2011/0068631 A1    Mar. 24, 2011

(30) Foreign Application Priority Data

Jun. 10, 2008 (GB) .................................. 0810512.4

(51) Int. Cl.
*H02J 1/00* (2006.01)
(52) U.S. Cl.
USPC .......................................................... 307/69
(58) Field of Classification Search
USPC .......................................................... 307/69
See application file for complete search history.

(56) References Cited

U.S. PATENT DOCUMENTS

| | | | |
|---|---|---|---|
| 7,906,870 B2 * | 3/2011 | Ohm ................................ | 307/69 |
| 2003/0098671 A1 * | 5/2003 | Hochgraf ........................ | 322/36 |
| 2006/0082936 A1 | 4/2006 | Ye et al. | |
| 2007/0096471 A1 * | 5/2007 | Lakov et al. ................ | 290/40 A |

FOREIGN PATENT DOCUMENTS

| | | |
|---|---|---|
| EP | 0 576 271 A2 | 12/1993 |
| EP | 1 574 672 A2 | 9/2005 |
| EP | 1 764 894 A1 | 3/2007 |

OTHER PUBLICATIONS

Zeineldin et al., "Islanding detection of inverter-based distributed generation," *IEE Proc.-Gener. Transm. Distrib.*, 2006, vol. 153, No. 6, pp. 644-652.
Zeineldin et al., "Impact of DG interface Control on Islanding Detection and Nondetection Zones," *IEEE Transactions on Power Delivery*, 2006, vol. 21, No. 3, pp. 1515-1523.
International Search Report in International Application No. PCT/GB2009/001204; dated Sep. 23, 2009.
Written Opinion of International Searching Authority in International Application No. PCT/GB2009/001204; dated Sep. 23, 2009.

* cited by examiner

*Primary Examiner* — Jared Fureman
*Assistant Examiner* — Duc M Pham
(74) *Attorney, Agent, or Firm* — Oliff & Berridge, PLC

(57) ABSTRACT

A local electrical system having an electrical generator is connected to an electrical generator network. The local electrical system has a controller to avoid the non-detection zone of loss-of-mains relays. The controller is arranged to monitor the real power flow from the electrical generator network to the local electrical system and to determine if the absolute value of the real power flow is below a first predetermined value to determine if there is a close match between the power requirements of the local electrical system and the electrical generator. If there is a close match, then the controller is arranged to monitor the reactive power flow the same way. If there is a close match also with the reactive power, then the controller is arranged to adjust the target reactive power output from the electrical generator of the local electrical system.

16 Claims, 2 Drawing Sheets

ELECTRICAL GENERATOR NETWORK AND A LOCAL ELECTRICAL SYSTEM

The present invention relates to an electrical generator network and a local electrical system.

Existing methods of detecting loss-of-mains electrical supply are split into two categories, passive methods and active methods.

Passive methods of detecting loss-of-mains electrical supply are based on "ROCOF", rate of change of frequency, detection relays or "Vector Shift" relays. Both of these methods operate on roughly the same principle. When a loss-of-mains event occurs, part of an electrical system is isolated from the remainder of the electrical system forming a power island containing one or more local electrical generators and a load, termed a "trapped load". The remainder of the electrical system contains a plurality of electrical generators and loads. Within the power island there is usually a finite imbalance between the local electrical generators and the trapped load. All the electrical generators and loads trapped within the power island are considered in this balance. An imbalance in either real power or reactive power enables the detection of loss-of-mains, as long as the imbalance is large enough to result in a frequency change ROCOF, rate of change of frequency, which rises above a threshold value of the ROCOF, Vector Shift relay or similar detection relay. If both the real power and the reactive power are both well-balanced within the power island, within approximately 2.5% of the power island electrical generation capacity, then there is a risk that, for normal ROCOF relay settings, detection of the power island may not occur for more than 2 seconds.

In theory, if both the active and reactive power generation and demand are balanced within the power island, then it may be impossible to detect loss-of-mains while that balance prevails, possibly for a period of several minutes. This presents a hazard to the operation of electrical systems, and the potential inability to detect loss-of-mains is a barrier to deployment of distributed electrical generators. However, naturally occurring changes in load and generation mean that a good balance between generation and load is unlikely to persist. Also, the standard drooped control loops for electrical generator governors and AVRs, Automatic Voltage Regulators, in the grid-connected mode, are generally, or are made to be, unstable if the electrical system becomes accidentally islanded. Therefore, practical detection times have been shown to be up to 12 seconds in the laboratory if the electrical system is initially very well balanced, with standard grid connected control algorithms and minimal load/generation fluctuations.

Active methods of detecting loss-of-mains electrical supply specific to inverter-connected electrical generators is based upon injection of electrical currents with harmonic content into the electrical system, either in a steady-state fashion or a burst fashion. Many operators of electrical generators object to the deliberate injection of harmonic electrical currents because it may compromise the quality of the electrical power.

Active methods of detecting loss-of-mains electrical supply applicable to all types of electrical generators, including synchronous electrical generators is based upon deliberately varying the reactive power output, reactive power dithering, of an electrical generator and measuring the corresponding changes in the mains voltage and frequency. The changes in the mains voltage and frequency are greater following a loss-of-mains and this is the basis for detection of loss-of-mains. However, no actual application of this technique is known. For a synchronous electrical generator the field current would require modulating at a suitable frequency. This frequency must be high enough to keep detection time below 2 seconds, but slow enough be tracked by the field drive. Upon unintentional islanding, the modulation results, not in a changing reactive power exchange with the remainder of the electrical system (to which it is no longer connected), but in a modulated AC RMS voltage level in the local electrical system. If such a perturbation of the AC RMS voltage magnitude is detected which corresponds with the field current modulation frequency, then a loss-of-mains trip signal is generated.

A further possible proposed method of detecting loss-of-mains electrical supply is to use reactive power dithering to improve the discrimination of ROCOF or Vector shift relay protection. However, no actual application of this technique is known. Following the detection of a rate of change of frequency, the excitation of the electrical generator is changed to discriminate between a loss-of-mains and an electrical system wide frequency disturbance unrelated to loss-of-mains. This avoids the objection of continuous deliberate disturbance to an electrical system.

The passive methods of detecting loss-of-mains electrical supply rely on there being enough mis-match between the load and the electrical generation to trip protection relays. This relies on chance and this is unacceptable.

The active methods of detecting loss-of-mains electrical supply rely on reactive power dithering to introduce varying reactive power flows within the electrical system. These variations in reactive power flow must be at a frequency of around 2 Hz or slightly above, in order to enable detection within 2 seconds. This cyclic reactive power variation causes small voltage changes locally due to the impedance of the equipment of the electrical system. This cyclic voltage change may objectionable flicker of incandescent lamps. If the electrical system itself is small, for example in a ship, then the cyclic reactive power variation flows at such frequencies may excite oscillations in the electrical system.

There is also an active anti-islanding system for an electric power plant as described in published European patent application EP1574672A2 and an anti-islanding protection system for synchronous machine based distributed generators as described in published US patent application US20060082936A1.

Accordingly the present invention seeks to provide a novel electrical system, which reduces, preferably overcomes, the above mentioned problem.

Accordingly the present invention provides an electrical generator network comprising a plurality of electrical generators and a plurality of local electrical systems, each local electrical system having an electrical generator, at least one of the local electrical systems having a controller to avoid the non-detection zone of loss-of-mains relays, the controller being arranged to monitor the real power flow from the electrical generator network to the at least one of the local electrical systems, the controller being arranged to determine if the absolute value of the real power flow from the electrical generator network to the at least one of the local electrical system is below a first predetermined value to determine if there is a close match between the power requirements of the at least one of the local electrical system and the respective electrical generator, if the controller determines that the absolute value of the real power flow from the electrical generator network to the at least one of the local electrical systems is below the first predetermined value then the controller is arranged to monitor the reactive power flow from the electrical generator network to the at least one of the local electrical systems, the controller being arranged to determine if the absolute value of the reactive power flow from the electrical generator network to the at least one of the local electrical systems is below a second predetermined value to determine if there is a close match between the real and reactive power requirements of the local electrical systems and the real and reactive power produced by the respective electrical generator, if the controller determines that the absolute value of the reactive power flow from the electrical generator network to the at least one of the local electrical systems is below the second predetermined value then the controller is arranged to adjust the target reactive power output from the electrical generator of the at least one of the local electrical systems such that the reactive power flow from the electrical generator network to the at least one of the local electrical systems has an absolute value of plus or minus the second predetermined value.

Preferably the controller is arranged to match the local real power demand of the at least one of the local electrical systems with the real power generation target of the respective electrical generator.

Preferably a plurality of the local electrical systems have a controller to avoid the non-detection zone of loss-of-mains relays.

More preferably all the local electrical systems have a controller to avoid the non-detection zone of loss-of-mains relays.

Preferably the at least one of the local electrical systems has a sensor to measure the real power flow from the electrical generator network to the at least one of the local electrical systems and the sensor is arranged to send the measurement to the controller.

Preferably the at least one of the local electrical systems has a sensor to measure the local load reactive power demand, the sensor is arranged to send the measurement to the controller and the controller calculates the reactive power flow from the electrical generator network to the at least one of the local electrical systems by subtracting the normal generator output target from the measured local load reactive power demand.

Preferably the electrical generator network has at least 10 GVA of electrical current generation in service at any time, the loss-of-mains detection relays are set with trigger thresholds of about 0.2 Hz/s, the first predetermined value $P_t$ and the second predetermined value $Q_t$ are set to 0.05 pu, the local electrical generator frequency droop against real power is 5% and the local electrical generator voltage droop against reactive power is 10%.

Alternatively the electrical generator network has at least 1 MVA of electrical current generation in service at any time, the loss-of-mains detection relays are set with trigger thresholds of about 0.5 Hz/s, the first predetermined value $P_t$ and the second predetermined value $Q_t$ are set to 0.1 pu, the local electrical generator frequency droop against real power is 5% and the local electrical generator voltage droop against reactive power is 10%.

The present invention also provide a local electrical system having an electrical generator, the local electrical system being connected to an electrical generator network, the local electrical system having a controller to avoid the non-detection zone of loss-of-mains relays, the controller being arranged to monitor the real power flow from the electrical generator network to the local electrical system, the controller being arranged to determine if the absolute value of the real power flow from the electrical generator network to the local electrical system is below a first predetermined value to determine if there is a close match between the power requirements of the local electrical system and the electrical generator, if the controller determined that the absolute value of the real power flow from the electrical generator network to the local electrical system is below the first predetermined value then the controller is arranged to monitor the reactive power flow from the electrical generator network to the local electrical system, the controller being arranged to determine if the absolute value of the reactive power flow from the electrical generator network to the local electrical system is below a second predetermined value to determine if there is a close match between the real and reactive power requirements of the local electrical system and the real and reactive power produced by the electrical generator, if the controller determines that the absolute value of the reactive power flow from the electrical generator network to the local electrical system is below the second predetermined value then the controller is arranged to adjust the target reactive power output from the electrical generator of the local electrical system such that the reactive power flow from the electrical generator network to the local electrical systems has an absolute value of plus or minus the second predetermined value.

Preferably the controller is arranged to match the local real power demand of the local electrical system with the real power generation target of the respective electrical generator.

Preferably the local electrical system has a sensor to measure the real power flow from the electrical generator network to the local electrical system and the sensor is arranged to send the measurement to the controller.

Preferably the local electrical system has a sensor to measure the local load reactive power demand, the sensor is arranged to send the measurement to the controller and the controller calculates the reactive power flow from the electrical generator network to the local electrical system by subtracting the normal generator output target from the measured local load reactive power demand.

Preferably the electrical generator network has at least 10 GVA of electrical current generation in service at any time, the loss-of-mains detection relays are set with trigger thresholds of about 0.2 Hz/s, the first predetermined value $P_t$ and the second predetermined value $Q_t$ are set to 0.05 pu, the local electrical generator frequency droop against real power is 5% and the local electrical generator voltage droop against reactive power is 10%.

Alternatively the electrical generator network has at least 1 MVA of electrical current generation in service at any time, the loss-of-mains detection relays are set with trigger thresholds of about 0.5 Hz/s, the first predetermined value $P_t$ and the second predetermined value $Q_t$ are set to 0.1 pu, the local electrical generator frequency droop against real power is 5% and the local electrical generator voltage droop against reactive power is 10%.

The present invention will be more fully described by way of example with reference to the accompanying drawings in which.

Figure 1:
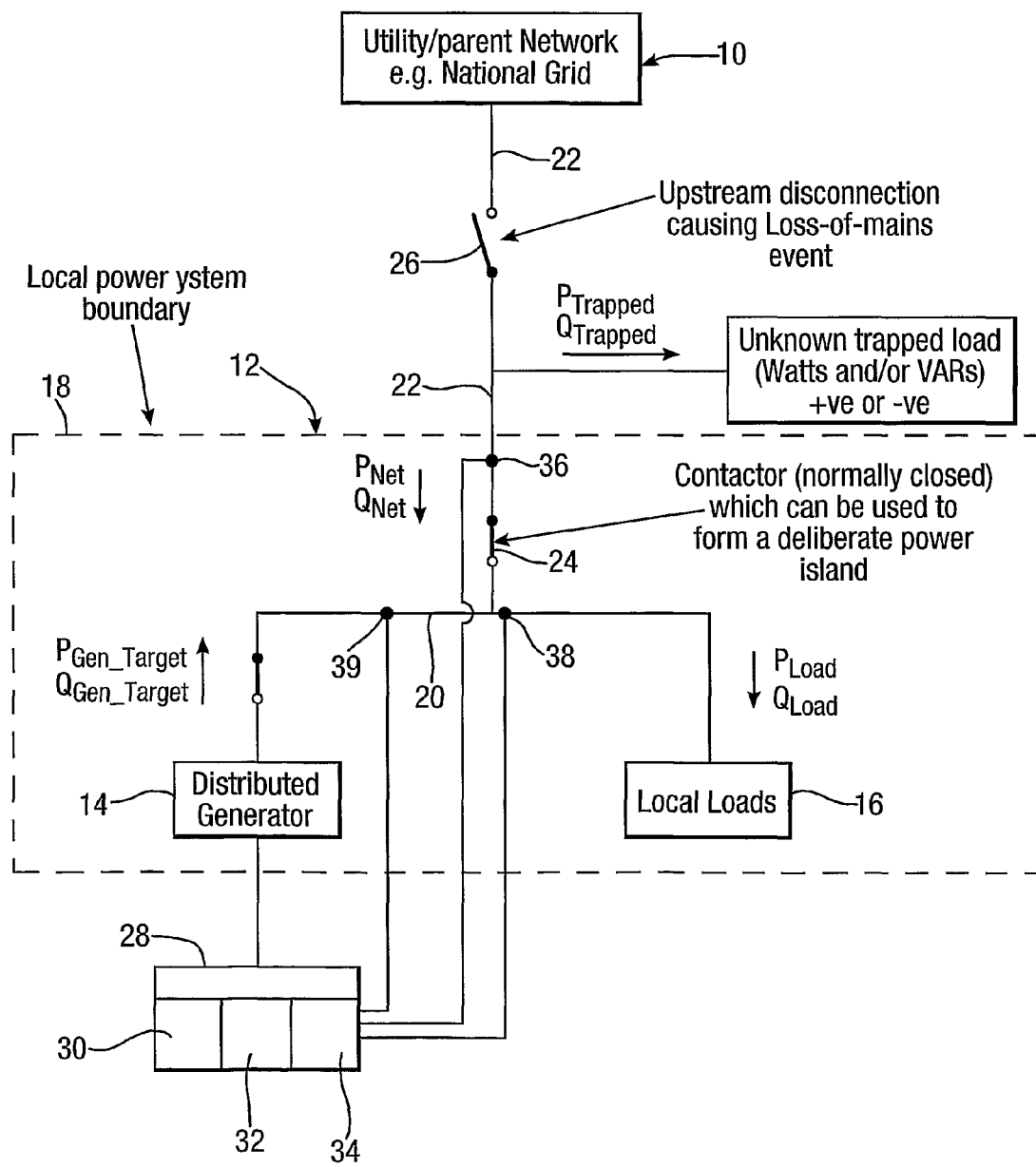
FIG. 1 shows a schematic diagram of an electrical generator network according to the present invention.

An electrical generator network 10, as shown in FIG. 1, comprises a plurality of local electrical systems 12, only one of which is shown. Each local electrical system 12 comprises an electrical generator 14 and one or more local electrical loads 16. The boundary of the local electrical system 12 is denoted by the dashed lines 18. The electrical generator 14 is electrically connected to the local electrical loads 16 by power lines 20 and the local electrical system 12 is electrically connected to the remainder of the electrical generator network 10 by power lines 22.

The local electrical system 12 has a contactor, or switch, 24 provided in the power lines 22. The contactor 24 is normally closed to connect the local electrical system 12 to the electrical generator network 10, but the contactor 24 may be opened to deliberately isolate the local electrical system 12 from the electrical generator network 10 to form a power island.

The power lines 22 are also provided with a switch 26 to isolate the local electrical system 12 from the electrical generator network 10 in emergency situations and this results in a loss-of-mains event or islanding of the local electrical system 12.

The electrical generator 14 comprises a control unit 28. The control unit 28 comprises a reactive power control mechanism 30 and the reactive power control mechanism 30, in the mode when it is connected to the electrical generator network 10, comprises a droop controller which provides drooped control against voltage with a nominal reactive power Q set point. The reactive power Q set point is either a fixed VAR value, Volt-Ampere Reactive value, or a value determined by a target power, factor, leading or lagging, and the actual electrical generator 14 real power output. The reactive power control mechanism 30 is stable when the electrical generator 12 is connected to the electrical generator network 10, but is generally, or may be arranged to be, unstable if the local electrical system 12 is unintentionally islanded due to a loss-of-mains event caused by the opening of the switch 26. The instability in the reactive power control mechanism 30 arises from phase lags within the droop controller and the response of the electrical generator 14, combined with the gain of the droop controller, which is normally significantly more than unity.

The control unit 28 also comprises a real power control mechanism 32. The real power control mechanism 32, in the mode when it is connected to the electrical generator network 10, comprises a droop controller which provides drooped control against voltage with a nominal real power P set point. The real power control mechanism 32 is stable when the electrical generator 12 is connected to the electrical generator network 10, but is generally, or may be arranged to be, unstable if the local electrical system 12 is unintentionally islanded due to a loss-of-mains event caused by the opening of the switch 26. The instability in the real power control mechanism 32 arises from phase lags within the droop controller and the response of the electrical generator 14, combined with the gain of the droop controller, which is normally significantly more than unity. In addition cross-linkages between the real power control mechanism 32 and the reactive power control mechanism 30 tend to make both the reactive power control mechanism 30 and the real power control mechanism 32 unstable as a whole. The real power control mechanism 32 and the reactive power control mechanism 30 are interdependent via the coupled dynamics of frequency and voltage within both the electrical generator 14 and the local electrical loads 16. For example a change in the reactive power affects the voltage which in turn alters the active demand taken by resistive electrical loads and this affects frequency. Any change in frequency changes the reactance of reactive electrical loads and this affects the reactive demand.

Figure 2:
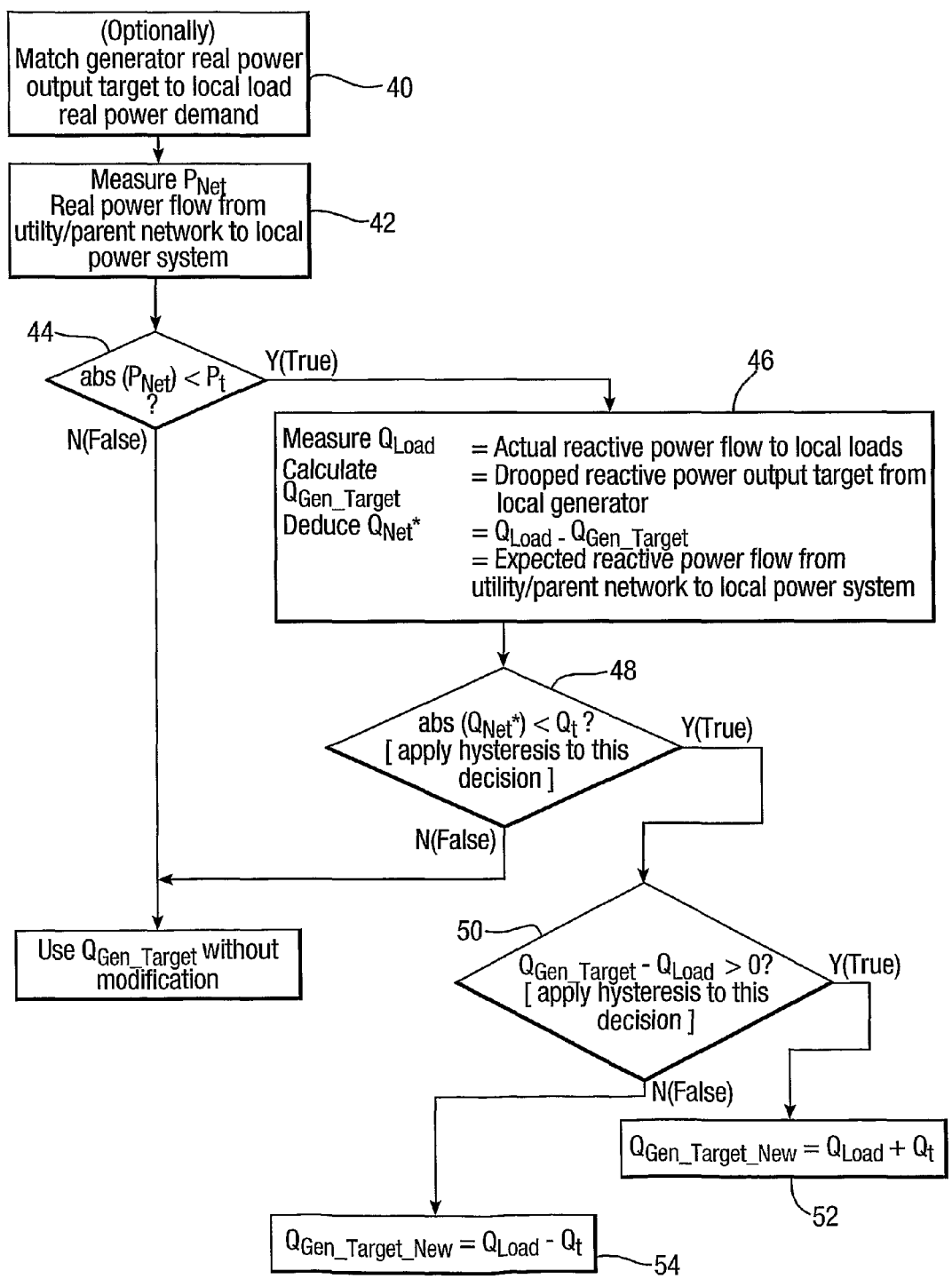
FIG. 2 is a flow chart for the controller of an electrical generator in an electrical generator network according to the present invention.

An alternative to the droop controller in the real power control mechanism 32 is an active, and deliberate, balancing of local electrical generator 14 real power output to the local real power load demand of the local electrical loads 16. This is shown in FIG. 2, to be discussed later. This control mechanism is not classically unstable if the local electrical system 12 is unintentionally islanded due to a loss-of-mains event caused by the opening of the switch 26. The control loop gain is in fact zero and it thus has no restorative control effect on frequency, so any perturbations of the system from its initial frequency upon islanding will tend to lead to an increasing divergence of local electrical system 12 frequency from nominal. This effect is further enhanced by the cross-coupling, via the dynamics of frequency and voltage within the local electrical generator 14 and local electrical loads 16, of the real power control mechanism 32 to the reactive power control mechanism 30 which is unstable in isolation.

The overall effect is that the control mechanisms 30 and 30 of the local electrical generator 14 of the local electrical system 12, when operating in a grid-connected mode, are inherently unstable when an unintentional islanding event occurs.

The present invention provides a further control mechanism 34 to ensure that either the real power flow $P_{Net}$ or reactive power flow $Q_{Net}$ between the local electrical system 12 and the electrical generator network 10 is above certain thresholds. These thresholds are small in per-unit terms. However, these thresholds are large enough such that, upon unintentional islanding, the local electrical system 12 control is always perturbed such that the unstable reactive power control mechanism 30 and the real power control mechanism 32 result in oscillation and detectable loss-of-mains conditions within less than a predetermined period of time, e.g. 2 seconds. Once loss-of-mains conditions have been detected appropriate action may be taken to before a collapse of the islanded local electrical system 12 occurs. The detection of loss-of-mains conditions may lead to tripping of the local electrical generator 14. However, a more desirable action is to maintain the local electrical generator 12 in service and to ride-through the loss-of-mains event by switching quickly to a control mode for the local electrical generator 14 which is stable in the islanded mode, such as frequency and voltage control, and operating the islanded local electrical system 12 in an intentionally islanded mode. This intentionally islanded mode of operation of the local electrical system 12 is appropriately managed to ensure safety of maintenance staff and to avoid an out-of-phase re-closure with the electrical generator network 10.

The operation of the further control mechanism 34 is illustrated more fully by a flow chart in FIG. 2. The further control mechanism 34 comprises an algorithm.

Firstly, optionally or intentionally in step 40 the further control mechanism 34 matches the local real power generation target $P_{Gen\_Target}$ (Watts) with the local real power demand $P_{Load}$ (Watts). This optional step may be an important precursor to deliberately islanded operation, because it minimises the frequency and prime mover transients when the change from grid-connected mode to islanded operation mode occurs.

Secondly in step 42 the further control mechanism 34 monitors the real power flow $P_{Net}$ from the electrical generator network 10 to the local electrical system 12 in particular the further control mechanism 34 measures the real power exchange from the electrical generator network 10 to the local electrical system 12 that is at risk of islanding. Note that if step 40 was implemented, there is a high chance that $P_{Net}$ is small. A sensor 36 is arranged to measure the real power flow $P_{Net}$ and reactive power flow $Q_{Net}$ and to supply the measurements to the further control mechanism 34.

Thirdly in step 44 the further control mechanism 34 determines if the absolute value of the real power flow $P_{Net}$ from the electrical generator network 10 to the local electrical system 12 is below a first predetermined value $P_t$ to determine if there is a close match between the real power requirements of the local electrical system 12 and the respective electrical generator 14. This step excludes trapped load. The flag $P_{Match}$ is set to true Y, otherwise $P_{Match}$ is set to false N. If $P_{Match}$ is false N then the further control mechanism 34 is finished and starts again at step 40 in the next execution time frame. If $P_{Match}$ is true Y then the further control mechanism 34 continues to the next step 46.

Fourthly in step 46 the further control mechanism 34 monitors the reactive power flow $Q_{Net}$ from the electrical generator network 10 to the local electrical system 12. In practice, due to hysteresis considerations within the following control algorithm, $Q_{Net}$ is not measured directly, but instead is deduced as $Q_{Net*}$ by subtracting the normal generator VAR output target $Q_{Gen\_Target}$, after the set point Q target and droop controls have been applied, from the measured local load reactive power demand $Q_{Load}$. A sensor 38 on line 20 may be arranged to measure the local load reactive power demand $Q_{Load}$ and to supply the measurement to the further control mechanism 34. Alternatively, $P_{Load}$ and $Q_{Load}$ may be deduced by using a sensor 39 on line 20 to measure the actual local electrical generator 14 real power flow $P_{Gen}$ and reactive power flow $Q_{Gen}$, and setting $P_{Load}=P_{Gen}+P_{Net}$ and $Q_{Load}+Q_{Gen}+Q_{Net}$. This removes the need for a sensor 38.

Fifthly in step 48 the further control mechanism 34 determines if the absolute value of the reactive power flow $Q_{Net}$ from the electrical generator network 10 to the local electrical system 12 is below a second predetermined value $Q_t$ to determine if there is a close match between the real and reactive power requirements of the local electrical system 12 and the real and reactive power produced by the respective electrical generator 14. This step also excludes trapped load. The flag $Q_{Adjust}$ is set to true Y, otherwise $Q_{Adjust}$ is set to false N. If $Q_{Adjust}$ is false N then the further control mechanism 34 is finished and starts again at step 40 in the next execution time frame. If $Q_{Adjust}$ is true Y then the further control mechanism 34 proceeds to the next step 50.

Sixthly in step 50 the further control mechanism adjusts the target reactive power output $Q_{Gen\_Target}$ from the electrical generator 14 of the local electrical system 14 such that the reactive power flow from the electrical generator network 10 to the local electrical system 12 has an absolute value of plus or minus the second predetermined value $Q_t$. The second predetermined value is a threshold value below which the absolute value of $Q_{Net}$ should not fall. Finally the target reactive power output $Q_{Gen\_Target}$ is adjusted either up, increased, or down, decreased, in order to achieve an absolute value for $Q_{Net}>Q_t$ with the minimum adjustment to the original target reactive power output $Q_{Gen\_Target}$ in step 52 or 54. The decision to adjust up may be made using a flag $Q_{Adjust\_up}=(Q_{Gen\_Target}-Q_{Load}>0)$. This means that if $Q_{Gen\_Target}>Q_{Load}$, $Q_{Adjust}{}^{up}$ is true Y or false N. The idea here is that if $Q_{Gen\_Target}>Q_{Load}$, reactive power is already flowing from the local electrical system 12 back into the electrical generator network 10, but the magnitude of the reactive power flow is less than $Q_t$ as already determined. Thus, in this case, increasing the reactive power output from the local electrical generator 14 by less than $Q_t$ will cause the absolute value of $Q_{Net}>Q_t$ which is the desired result. If the local electrical generator 14 output was reduced, then it would be reduced by more than $Q_t$ to achieve the absolute value of $Q_{Net}>Q_t$.

The modified local electrical generator 14 reactive power output target is now calculated from $Q_{Gen\_Target\_New}=Q_{Load}+Q_t$, if $Q_{Adjust\_up}$ is true, or $Q_{Gen\_Target\_New}=Q_{Load}-Q_t$, if if $Q_{Adjust}{}^{up}$ is false. A final check is that if $Q_{Gen\_Target\_New}$ is within the acceptable control range of the local electrical generator 14. If not, then the setting of $Q_{Adjust\_up}$ is inverted and the value of $Q_{Gen\_Target\_New}$ recalculated.

In reality, in addition to the steps described previously, appropriate hysteresis, involving time and/or decision thresholds, may be applied during the decision making processes which set the Boolean values of $P_{Match}$, $Q_{Adjust}$, $Q_{Adjust\_up}$. This hysteresis avoids the controls changing regularly from 0 to 1 and vice versa when the active and reactive power flows are hovering around the decision thresholds, first predetermined value and the second predetermined value. It is possible to convert the Boolean value $Q_{Adjust\_up}$, with a value of 0 or 1, into a floating point value $Q_{Adjust\_Direction}$ with a value of −1 or +1 respectively. This may be passed through a slew-rate filter with appropriate slew rate limits to give $Q_{Adjust\_Direction\_Rate\_Limited}$. This slew-rate limiting simply smoothes out any step changes to the local electrical generator reactive power targets which may otherwise occur. $Q_{Gen\_Target\_New}$ may then be calculated from $Q_{Gen\_Target\_New}=Q_{Load}+Q_t*Q_{Adjust\_Direction\_Rate\_Limited}$.

There may be trapped loads outside the boundary of the local electrical system 12, as shown in FIG. 1. If a loss of mains event occurs, it may result in further electrical loads or further electrical generators becoming part of the unintentional power island.

The worst case would be if the local generated active/real power $P_{Gen}$ is not deliberately matched to $P_{Load}$ and is in fact accidentally almost matched to ($P_{Load}+P_{Trapped}$) and also if a close reactive power match accidentally exists between $Q_{Gen}$ and ($Q_{Load}+Q_{Trapped}$). This is an unlikely but potential event. Note that this scenario may be avoided by deliberately matching $P_{Gen}$ to $P_{Load}$ as in the optional step 40 described previously. This means that if $P_{Trapped}$ is significant, i.e. the absolute value ($P_{Trapped}>P_t$), then $P_{Gen}$ will never be approximately equal to ($P_{Load}+P_{Trapped}$) because $P_{Gen}=P_{Load}$. If $P_{Trapped}$ is very close to zero, i.e. absolute value of $P_{Trapped}<$ or $=P_t$, then $P_{Gen}$ will be very close to ($P_{Load}+P_{Trapped}$) but in this case the further control mechanism 34 steps 42 to 50 will take place. For an accidental close match of reactive power $Q_{Gen}=(Q_{Load}+Q_{Trapped})$ to then also to occur, the absolute value of $Q_{Trapped}$ would then have to be > or = to $Q_t$. This is unlikely if absolute value of $P_{Trapped}<$ or $=$ to $P_t$, unless the trapped load, or trapped generator, has an extremely poor power factor. Thus, it can be seen that, counter intuitively, operating the local electrical system 12 with a deliberate match of local real power generation to local power demand may be used as a tool to avoid the non-detection zone of loss-of-mains, when the possibility of additional trapped loads exists. This is because the local electrical generator is obliged to supply a trapped load following islanding and therefore disturbs the careful balance of active and reactive power.

Experiments in a laboratory at a 2 to 10 kVA scale suggest that the following threshold values are approximately sufficient to guarantee detection of loss-of-mains, within microgrid power systems with distributed generation, when $P_{Gen}$ is deliberately matched to $P_{Load}$. For a microgrid connected to a large electrical generator network with at least 10 GVA of electrical current generation in service at any time, such as national grids in large industrial countries, loss-of-mains detection relays set with trigger/trip thresholds of about 0.2 Hz/s, $P_t$ and $Q_t$ set to 0.05 pu. The local electrical generator frequency droop against real power of 5%. The local electrical generator voltage droop against reactive power of 10%. The loss-of-mains detection will occur within 2 seconds. For a microgrid connected to a smaller electrical generator network with at least 1 MVA of electrical current generation in service at any time, loss-of-mains detection relays set with trigger/trip thresholds of about 0.5 Hz/s, $P_t$ and $Q_t$ set to 0.1 pu. The local electrical generator frequency droop against real power of 5%. The local electrical generator voltage droop against reactive power of 10%. The loss-of-mains detection will occur within 2 seconds. Widening the rate of change of frequency (ROCOF) thresholds further above 0.5 Hz/s requires a corresponding increase in $P_t$ and $Q_t$ to guarantee detection of loss-of-mains within 2 seconds.

The advantage of the present invention is that it allows the detection of loss-of-mains, or islanding, within a predetermined period of time, e.g. 2 seconds, even when active power generation is perfectly matched to load demand within an unintentionally islanded local electrical system. The present invention is applicable to all electrical generator types which allow control over reactive power output. The present invention reduces the risk of non-detection of unintentional islanding of a local electrical system within a predetermined period of time, e.g. 2 seconds. This in turn minimises the risk of damage to equipment through subsequent re-closure between two out of phase electrical systems, e.g. the local electrical system and the electrical generator network and minimises the risk to electrocution of personnel. The present invention is applicable to land based distributed electrical generator networks, marine AC electrical generator networks, and possibly aero AC electrical generator networks.

The invention claimed is:

1. An electrical generator network comprising a plurality of electrical generators and a plurality of local electrical systems, each local electrical system having an electrical generator, at least one of the local electrical systems having a controller to avoid the non-detection zone of loss-of-mains relays, the controller being arranged to monitor the real power flow from the electrical generator network to the at least one of the local electrical systems, the controller being arranged to determine if the absolute value of the real power flow from the electrical generator network to the at least one of the local electrical systems is below a first predetermined value to determine if there is a close match between the power requirements of the at least one of the local electrical system and the respective electrical generator, if the controller determines that the absolute value of the real power flow from the electrical generator network to the at least one of the local electrical systems is below the first predetermined value then the controller is arranged to monitor the reactive power flow from the electrical generator network to the at least one of the local electrical systems, the controller being arranged to determine if the absolute value of the reactive power flow from the electrical generator network to the at least one of the local electrical systems is below a second predetermined value to determine if there is a close match between the real and reactive power requirements of the local electrical systems and the real and reactive power produced by the respective electrical generator, if the controller determines that the absolute value of the reactive power flow from the electrical generator network to the at least one of the local electrical systems is below the second predetermined value then the controller is arranged to adjust the target reactive power output from the electrical generator of the at least one of the local electrical systems such that the reactive power flow from the electrical generator networks to the at least one of the local electrical systems has an absolute value of plus or minus the second predetermined value.

2. An electrical generator network as claimed in claim 1 wherein the controller is arranged to match the local real power demand of the at least one of the local electrical systems with the real power generation target of the respective electrical generator.

3. An electrical generator network as claimed in claim 1 wherein a plurality of the local electrical systems have a controller to avoid the non-detection zone of loss-of-mains relays.

4. An electrical generator network as claimed in claim 3 wherein all the local electrical systems have a controller to avoid the non-detection zone of loss-of-mains relays.

5. An electrical generator network as claimed in claim 1 wherein the at least one of the local electrical systems has a sensor to measure the real power flow from the electrical generator network to the at least one of the local electrical systems and the sensor is arranged to send the measurement to the controller.

6. An electrical generator network as claimed in claim 1 wherein the at least one of the local electrical systems has a sensor to measure the local load reactive power demand, the sensor is arranged to send the measurement to the controller and the controller calculates the reactive power flow from the electrical generator network to the at least one of the local electrical systems by subtracting the normal generator output target from the measured local load reactive power demand.

7. An electrical generator network as claimed in claim 1 wherein the electrical generator network has at least 10 GVA of electrical current generation in service at any time, the loss-of-mains detection relays are set with trigger thresholds of about 0.2 Hz/s, the first predetermined value and the second predetermined value set to 0.05 pu, the local electrical generator frequency droop against real power is 5% and the local electrical generator voltage droop against reactive power is 10%.

8. An electrical generator network as claimed in claim 1 wherein the electrical generator network has at least 1 MVA of electrical current generation in service at any time, the loss-of-mains detection relays are set with trigger thresholds of about 0.5 Hz/s, first predetermined value and the second predetermined value are set to 0.1 pu, the local electrical generator frequency droop against real power is 5% and the local electrical generator voltage droop against reactive power is 10%.

9. A local electrical system having an electrical generator, the local electrical system being connected to an electrical generator network, the local electrical system having a controller to avoid the non-detection zone of loss-of-mains relays, the controller being arranged to monitor the real power flow from the electrical generator network to the local electrical system, the controller being arranged to determine if the absolute value of the real power flow from the electrical generator network to the local electrical system is below a first predetermined value to determine if there is a close match between the power requirements of the local electrical system and the electrical generator, if the controller determines that the absolute value of the real power flow from the electrical generator network to the local electrical system is below the first predetermined value then the controller is arranged to monitor the reactive power flow from the electrical generator network to the local electrical system, the controller being arranged to determine if the absolute value of the reactive power flow from the electrical generator network to the local electrical system is below a second predetermined value to determine if there is a close match between the real and reactive power requirements of the local electrical system and the real and reactive power produced by the electrical generator if the controller determines that the absolute value of the reactive power flow from the electrical generator network to the local electrical system is below the second predetermined value then the controller is arranged to adjust the target reactive power output from the electrical generator of the local electrical system such that the reactive power flow from the electrical generator network to the local electrical system has an absolute value of plus or minus the second predetermined value.

10. A local electrical system as claimed in claim 9 wherein the controller is arranged to match the local real power demand of the local electrical system with the real power generation target of the respective electrical generator.

11. A local electrical system as claimed in claim 9 wherein the local electrical system has a sensor to measure the real power flow from the electrical generator network to the local electrical system and the sensor is arranged to send the measurement to the controller.

12. A local electrical system as claimed in claim 9 wherein the local electrical system has a sensor to measure the local load reactive power demand, the sensor is arranged to send the measurement to the controller and the controller calculates the reactive power flow from the electrical generator network to the local electrical system by subtracting the normal generator output target from the measured local load reactive power demand.

13. A local electrical system as claimed in claim 9 wherein the electrical generator network has at least 10 GVA of electrical current generation in service at any time, the loss-of-mains detection relays are set with trigger thresholds of about 0.2 Hz/s, the first predetermined value and the second predetermined value are set to 0.05 pu, the local electrical generator frequency droop against real power is 5% and the local electrical generator voltage droop against reactive power is 10%.

14. A local electrical system as claimed in claim 9 wherein the electrical generator network has at least 1 MVA of electrical current generation in service at any time, the loss-of-mains detection relays are set with trigger thresholds of about 0.5 Hz/s, the first predetermined value and the second predetermined value are set to 0.1 pu, the local electrical generator frequency droop against real power is 5% and the local electrical generator voltage droop against reactive power is 10%.

15. A method of avoiding the non-detection zone of loss-of-mains relays in an electrical generator network comprising a plurality of electrical generators and a plurality of local electrical systems, each local electrical system having an electrical generator, the method comprising monitoring the real power flow from the electrical generator network to at least one of the local electrical systems, determining if the absolute value of the real power flow from the electrical generator network to the at least one of the local electrical systems is below a first predetermined value to determine if there is a close match between the power requirements of the at least one of the local electrical system and the respective electrical generator, if it is determined that the absolute value of the real power flow from the electrical generator network to the at least one of the local electrical systems is below the first predetermined value the method comprises monitoring the reactive power flow from the electrical generator network to the at least one of the local electrical systems, determining if the absolute value of the reactive power flow from the electrical generator network to the at least one of the local electrical systems is below a second predetermined value to determine if there is a close match between the real and reactive power requirements of the local electrical systems and the real and reactive power produced by the respective electrical generator if it is determined that the absolute value of the reactive power flow from the electrical generator network to the at least one of the local electrical systems is below the second predetermined value then the method comprises adjusting the target reactive power output from the electrical generator of the at least one of the local electrical systems such that the reactive power flow from the electrical generator network to the at least one of the local electrical systems has an absolute value of plus or minus the second predetermined value.

16. A method of avoiding the non-detection zone of loss-of-mains relays in a local electrical system having an electrical generator, the local electrical system being connected to an electrical generator network, the method comprising monitoring the real power flow from the electrical generator network to the local electrical system, determining if the absolute value of the real power flow from the electrical generator network to the local electrical system is below a first predetermined value to determine if there is a close match between the power requirements of the local electrical system and the electrical generator if it is determined that the absolute value of the real power flow from the electrical generator network to the local electrical system is below the first predetermined value then the method comprises monitoring the reactive power flow from the electrical generator network to the local electrical system determining if the absolute value of the reactive power flow from the electrical generator network to the local electrical system is below a second predetermined value to determine if there is a close match between the real and reactive power requirements of the local electrical system and the real and reactive power produced by the electrical generator, if it is determined that the absolute value of the reactive power flow from the electrical generator network to the local electrical system is below the second predetermined value then the method comprises adjusting the target reactive power output from the electrical generator of the local electrical system such that the reactive power flow from the electrical generator network to the local electrical system has an absolute value of plus or minus the second predetermined value.

* * * * *